(12) United States Patent
Mathebula et al.

(10) Patent No.: US 11,221,096 B2
(45) Date of Patent: Jan. 11, 2022

(54) COUPLING DEVICE, A DRIVE ASSEMBLY FOR A COUPLING DEVICE AND A METHOD OF SUPPLYING A SUBSTANCE

(71) Applicant: CSIR, Pretoria (ZA)

(72) Inventors: Ipeleng Samson Mathebula, Pretoria (ZA); Mark Holloway, Pretoria (ZA); Hendrik Jacobus Theron, Pretoria (ZA); Kadephi Vuyolwethu Mjali, Pretoria (ZA)

(73) Assignee: CSIR, Pretoria (ZA)

( * ) Notice: Subject to any disclaimer, the term of this patent is extended or adjusted under 35 U.S.C. 154(b) by 441 days.

(21) Appl. No.: 16/338,967

(22) PCT Filed: Oct. 3, 2017

(86) PCT No.: PCT/IB2017/056090
§ 371 (c)(1),
(2) Date: Apr. 2, 2019

(87) PCT Pub. No.: WO2018/065896
PCT Pub. Date: Apr. 12, 2018

(65) Prior Publication Data
US 2021/0285587 A1    Sep. 16, 2021

(30) Foreign Application Priority Data

Oct. 3, 2016 (ZA) .................................. 2016/06784

(51) Int. Cl.
*F16L 37/44* (2006.01)
(52) U.S. Cl.
CPC ..................... *F16L 37/44* (2013.01)
(58) Field of Classification Search
CPC . F16L 37/23; F16L 37/38; F16L 37/40; F16L 37/44
See application file for complete search history.

(56) References Cited

U.S. PATENT DOCUMENTS 3,710,823 A * 1/1973 Vik .................... F16K 31/52425
                                                        137/594
4,074,698 A * 2/1978 Hobson .................... F16L 37/56
                                                        137/614.06
(Continued)

FOREIGN PATENT DOCUMENTS

EP          2 348 242 A1      7/2011
WO        WO 98/34459 A2     8/1998

OTHER PUBLICATIONS

International Search Report for PCT/IB2017/056090 dated Jan. 8, 2018.

*Primary Examiner* — Hailey K. Do
(74) *Attorney, Agent, or Firm* — Knobbe Martens Olson & Bear LLP (57) ABSTRACT

This invention relates to coupling devices, particularly to coupling devices for use with pressurized substances, for example, fluids such as liquids, gases, and plasmas; drive assemblies for said coupling devices; and to methods of supplying substances. The coupling device comprises a housing defining a chamber, the housing comprising inlet, outlet, and re-circulation/vent apertures; a valve assembly disposed in the chamber, the valve assembly comprising a valve; and a drive assembly located in the housing and operatively engageable with the valve assembly, wherein the drive assembly comprises a drive member disposed in the chamber; and a second cam member operatively engageable with the drive member and the valve assembly, wherein the second cam member is configured to be displaced by the drive member to cause the operation of the coupling device between uncoupled and coupled conditions, and the valve between the re-circulation/vent and charge conditions in a synchronized fashion.

20 Claims, 7 Drawing Sheets

(56) References Cited

U.S. PATENT DOCUMENTS

| | | | | |
|---|---|---|---|---|
| 4,181,150 A | * | 1/1980 | Maldavs | F16L 37/23 |
| | | | | 137/614.06 |
| 4,582,295 A | | 4/1986 | Kugler et al. | |
| 5,060,982 A | * | 10/1991 | Matsushita | F16L 37/413 |
| | | | | 285/190 |
| 5,575,510 A | * | 11/1996 | Weh | F16L 37/1215 |
| | | | | 285/312 |
| 5,901,747 A | * | 5/1999 | Rokkjaer | B67D 1/0839 |
| | | | | 137/614.2 |
| 5,988,697 A | * | 11/1999 | Arosio | F16L 37/23 |
| | | | | 285/124.1 |
| 6,016,835 A | * | 1/2000 | Maldavs | F16L 37/23 |
| | | | | 137/614 |

* cited by examiner

COUPLING DEVICE, A DRIVE ASSEMBLY FOR A COUPLING DEVICE AND A METHOD OF SUPPLYING A SUBSTANCE

CROSS REFERENCE TO RELATED APPLICATIONS

This application is a U.S. National Phase Application of PCT International Application Number PCT/IB2017/056090, filed on Oct. 3, 2017, designating the United States of America and published in the English language, which is an International Application of and claims the benefit of priority to South African Patent Application No. ZA 2016/06784, filed on Oct. 3, 2016. The disclosures of the above-referenced applications are hereby expressly incorporated by reference in their entireties.

FIELD OF INVENTION

THIS INVENTION relates to coupling devices, particularly to coupling devices for use with pressurized substances, for example, fluids such as liquids, gases, and plasmas; drive assemblies for said coupling devices; and to methods of supplying substances.

BACKGROUND OF THE INVENTION

Fluid coupling devices are often used to couple and/or uncouple fluid sources, for example, stationary high pressure gas sources, to movable storage vessels and/or dynamic target systems for the supply of pressurized fluid thereto. For example, refueling of Natural Gas Vehicles (NGV), and in certain cryogenically cooled infrared detection applications where pressurized gas is fed via coupling devices of the type mentioned at pressures exceeding 200 bars.

The high operating pressures associated with these systems require operators to adhere to strict operating procedures for the safe handling and transfer of gas. Prior art re-circulation/venting arrangements as described in, for example, U.S. Pat. Nos. 7,424,897, and 8,028,727 provide operators with built in safety elements to ensure safe coupling, charging, re-circulation/venting/re-circulation and uncoupling. Existing designs employ multiple parts to achieve the desired functionality, thereby, leading to an expensive, bulky and heavy package.

It is thus an object of the present invention to provide a coupling at least to address the aforementioned drawbacks associated with existing gas coupling packaging layouts.

SUMMARY OF THE INVENTION

According to a first aspect of the invention, there is provided a coupling device for coupling a fluid source to an output, wherein the coupling device comprises:
    a housing defining a chamber, the housing comprising inlet, outlet, and re-circulation/vent apertures in communication with the chamber;
    a valve assembly disposed in the chamber, the valve assembly comprising a valve having an inlet port accessible via the inlet aperture of the housing and connectable to the fluid source, an outlet port to output the fluid received from the inlet port, and a re-circulation/vent port accessible to via the re-circulation/vent aperture to vent the valve to atmosphere or re-circulate the fluid to an appropriate vessel, wherein the valve is operable between static, re-circulation/vent, and charge conditions, wherein in the static condition all the ports are closed, in re-circulation/vent condition the re-circulation/vent port and outlet port is open and the inlet port is closed, and in the charge condition the re-circulation/vent port is closed and both the inlet and outlet ports are open so as to permit fluid flow from the inlet port to the outlet port;
    a drive assembly located in the housing and operatively engageable with the valve assembly, wherein the drive assembly comprises:
        a drive member disposed in the chamber, wherein the drive member is displaceable relative to the chamber in first and opposite second directions of motion; and
        a second cam member operatively engageable with the drive member and the valve assembly, wherein the second cam member is configured to be displaced in the housing by the displacement of the drive member in the first and second directions of motion so as to cause the operation of the coupling device between coupled and uncoupled conditions, and the valve between the re-circulation/vent and charge conditions in a synchronized fashion.

It will be appreciated that the valve may be a trunnion valve. The coupling may be used in example embodiments wherein a non-return valve is installed downstream of the outlet of the coupling.

The drive member may be rotatably displaceable about its axis in the housing. Instead, or in addition, the drive member may be linearly displaceable in the housing along a longitudinal axis thereof. In other words, the drive member may be translationally displaceable relative to the housing.

The drive assembly may also comprise a first cam member operatively engageable with the drive member and the valve assembly, wherein the first cam member and the second cam member are configured to be displaced in the housing by at least the displacement of the drive member in the first and second directions of motion so as to cause the operation of the coupling device between uncoupled and coupled conditions, and the valve between the re-circulation/vent and charge conditions in a synchronized fashion.

The synchronized fashion referred to above may be a pre-determined synchronized fashion.

Displacement of the drive member in the first direction may cause the first cam member to operate the coupling device to the coupled condition, wherein in the coupled condition the valve assembly is connected or coupled to an outlet socket or plug operatively connectable to the outlet of the housing, and subsequently cause the second cam member to operate the valve to a charge condition, for example, upon further displacement of the drive member in the first direction. Similarly, displacement of the drive member in the second direction may cause the second cam member to operate the valve to the re-circulation/vent condition, and subsequently cause the first cam member to operate the coupling device to an uncoupled condition, for example, upon further displacement of the drive member in the second direction wherein in the uncoupled condition the valve assembly is disconnected or uncoupled from the outlet device.

In one alternate example embodiment, displacement of the drive member in the first direction may operate the coupling device to the coupled condition, wherein in the coupled condition the valve assembly is connected or coupled to an outlet socket or plug operatively connectable to the outlet of the housing, and subsequently cause the second cam member to operate the valve to a charge condition. Similarly, displacement of the drive member in the second direction may cause the second cam member to operate the valve to the re-circulation/vent condition, and subsequently operate the coupling device to an uncoupled condition, wherein in the uncoupled condition the valve assembly is disconnected or uncoupled from the outlet device.

In the last mentioned example embodiment of the invention, the drive member may be configured to engage the valve assembly, wherein linear displacement of the drive member in the first direction urges the second cam member and thus the valve assembly attachable thereto to also be linearly displaced in the first direction to bring the valve into operative communication with an outlet socket or plug operatively connectable to the outlet of the housing, and wherein further linear displacement of the drive member causes the second cam member to rotate about its axis so as to operate the valve to a charge condition. Similarly, linear displacement of the drive member in the second direction may cause the second cam member to operate the valve to the re-circulation/vent condition, and subsequently operate the coupling device to an uncoupled condition.

In one example embodiment, rotation of the drive member in a first direction displaces the first cam member from a first position in which the coupling is in an uncoupled condition to a second position in which the coupling is in a coupled condition; and with the first cam member in the second position, further rotation of the drive member in the first direction displaces the second cam member to operate the valve to the charge condition.

It will be noted that in rotation of the drive member in the second direction displaces the second cam to operate the valve from the charge condition to the re-circulation/vent condition; and with the valve operated in the re-circulation/vent condition, further rotation of the drive member in the second direction causes operation of the coupling device to the uncoupled condition.

The drive member may be cylindrical and may comprise first and second cam engaging elements in the form of transversely protruding members. In particular, the first cam engaging element may project outwardly from the drive member substantially transverse to the longitudinal axis of the drive member so as to engage the first cam member. The second cam engaging element may project inwardly from the drive member substantially transverse to the longitudinal axis of the drive member so as to engage the second cam member in use.

The first cam member may be a cylindrical cam and may define a cam track for receipt of the first cam engaging element therein such that rotation of the drive member causes substantially rectilinear displacement of the first cam member axially in the housing between first and second positions, wherein with the first cam member in the first position the coupling device is in the coupled condition and with the first cam member in the second position the coupling is in the uncoupled condition.

The cam track or groove of the first cam member may have a variable pitch spiral profile where the variable pitch spiral is coarse initially at a first portion thereof and gradually becomes finer at a second portion thereof such that the linear travel in the housing is reduced as the cam engaging element moves from the first portion into a second portion of the cam track with finer pitch. In other words, as the cam engaging member travels in the first portion of the cam track, the rotation of the cam member may have high sensitivity to linear displacement at a first value and vice versa. As the cam engaging member travels in the subsequent second portion of the cam track, the cam member may experience reduced linear to rotation sensitivity at a second value. In some example embodiments, the first cam member may have a cam track or groove with a fixed pitch spiral profile. In this example embodiment, the first cam member retains the liner to rotation sensitivity throughout the engagement and the engagement may be used to convert a linear displacement into a rotation and vice versa.

The second cam member may, in one example embodiment, be a cylindrical cam and may define a notch for receipt of the second cam engaging element therein. The second cam member may be attached removably or fixedly from to a valve actuator of the valve so as to operate the same, wherein rotation of the drive member, when the second cam engaging element is located in the notch, causes rotation of the second cam member between first and second positions causing operation of the valve between re-circulation/vent and charge conditions, and vice versa. In one example embodiment, the second cam member may define a circumferential slot or opening and the notch. The opening may introduce a dwell period for the initial part of the actuating movement and the notch is used to operate the valve with minimal hysteresis.

In other example embodiments of the invention, the second cam member may comprise a cam track or groove having a portion with a spiral or helical profile so as to convert linear actuation of the drive member into a rotation of the second cam member for operating the valve assembly between the charged, static and re-circulation/vent states once the coupling device is in the coupled condition. In this regard, the drive member may comprise a cam engaging member to engage with the cam of the second cam member so as to bring about rotation of the second cam member upon linear displacement of the drive member.

It will be noted that the second cam member may be rotated upon displacement of the drive member once the device is in the coupled condition. The first cam member, the drive member, and the second cam member may be co-axially arranged. In particular the second cam member may be locatable, at least partly, in the cylindrical drive member. The first cam member may house both the drive member and second cam member. The first cam member may further house the valve assembly. The valve assembly may be engageable with the first cam member via suitable pads and/or collars, for example, annular collars to maintain contact and provide a bearing surface between the first cam member and the valve assembly.

It will be appreciated that displacement of the first cam member linearly in the housing under action of the drive member may cause displacement of the valve assembly operatively engageable therewith, and thus the second cam member attached to the valve assembly, linearly in the housing until a predetermined position where the second cam engaging element of the drive member is brought into the notch of the second cam member such that further rotation of the drive member causes the second cam member to rotate between first and second positions so as to actuate the valve between re-circulation/vent and charge condition. The drive assembly may be synchronized such that the second cam engaging member is brought into the notch of the second cam member as the first cam engaging element is about to enter into the second portion of the cam track of the first cam member having finer pitch such that the first cam member is linearly displaced at the second value to the second position to operate the coupling to a coupled position as the second cam member begins to rotate, at substantially the speed of rotation of the drive member, to actuate the valve to the charge condition, wherein the first cam member is in the second position prior to the valve being actuated to the charge condition by the second cam member.

The valve assembly may comprise a valve socket or plug connected to the outlet port of the valve. The valve socket or plug is connectable to the outlet socket in the coupled condition so as to permit fluid received from the inlet port to be transmitted to the outlet socket via the outlet port of the valve. The valve assembly may comprise an annular valve socket or plug holder within which the valve socket is locatable, wherein the valve socket holder is shaped and dimensioned to be receivable in the first cam member.

In one example embodiment, one end of the first cam member may define internal walls which taper toward the end of the first cam member.

A switch may be provided to facilitate coupling of the valve socket to the outlet plug or a plug to an outlet socket, wherein the coupling device comprises a displaceable spherical member or ball located in a cradle defined by the valve socket holder and the inner surface of the cam member so as to engage the switch for controlling the latching action for the socket and plug or alternative latching point. With the first cam member in the first position, it will be noted that the ball may be located between the tapered inner wall of the first cam member and the switch so as to actuate the switch to prevent operation of the coupling device to the coupled condition. However, it will be noted that with the first cam member in the second positon, the ball may be located between a non-tapered inner wall of the first cam member and the valve socket holder so as to release the switch to operate the coupling device to the coupled condition.

The drive assembly may comprise a gear arrangement operatively connected to the drive member wherein operation of the gear arrangement causes axial rotation of the drive member in the first and second direction of rotation. In one example embodiment, the gear arrangement and thus the drive member is controllable via an electrically actuated motor in response to suitable control signals received thereby.

The first and second cam engaging elements may be axially spaced, for example, in pre-determined fashion.

In one example embodiment, the housing is cylindrical and extends along a longitudinal axis. It will be appreciated that the charge and re-circulation/vent apertures may be displaced in slots extending in the housing parallel to the longitudinal axis of the housing.

It will be appreciated that in linear displacement of the first cam member from the first to second positions, the first cam member and second cam member may also axially rotate accordingly.

According to a second aspect of the invention, there is provided a drive assembly for a fluid coupling comprising a housing defining a chamber which houses a valve assembly comprising a valve, and the drive assembly, wherein the drive assembly comprises:

a cylindrical drive member defining an interior and axially rotatable in a first direction and an opposite second direction, wherein the drive member comprises first and second cam engaging elements, the first cam engaging element projecting outwardly from an outer surface of the drive member substantially transverse to a longitudinal axis of the drive member, and the second cam engaging element projecting inwardly into the interior from an inner surface of the drive member substantially transverse to the longitudinal axis of the drive member;

a cylindrical first cam member defining a bore in which the drive member and the valve assembly is co-axially located, wherein the first cam member defines a cam track of variable pitch engageable by way of the first cam engaging element therein such that rotation of the drive member causes the first cam engaging member to displace the first cam member axially in the housing in substantially a rectilinear fashion between first and second positions so as, in use, to operate the coupling device between a coupled and uncoupled conditions, wherein displacement of the first cam member substantially causes axial displacement of the valve assembly in the housing; and a cylindrical second cam member arranged co-axially within the interior of the drive member, wherein the second cylindrical cam member is operatively attachable to an actuator of the valve and is displaceably engageable with the drive member, wherein the second cam member defines a notch for receipt of the second cam engaging element therein, and wherein displacement of the first cam member causes displacement of the second cam member and brings the second cam engaging element into engagement with the notch thereby to cause axial rotation of the second cam element by rotation of the drive member thereby to operative the valve, in use, in a predetermined synchronized fashion with operating the coupling device between coupled and uncoupled conditions.

It will be appreciated that the first cam member is engageable with the valve assembly and thus causes displacement of the second cam member linearly by engaging and displacing the valve assembly.

A method of supplying fluid from a fluid source to a target system, the method comprising:

providing a coupling device as described above;

controlling displacement of the drive member in a first direction to operate the coupling device to the coupled condition in a synchronous fashion, wherein in the coupled condition the valve assembly is coupled to a mating plug or socket on the outlet operatively connectable to the outlet of the housing, and subsequently operate the valve to a charge condition; and controlling displacement of the drive member in an opposite second direction so as to operate the valve to the re-circulation/vent condition in a synchronous fashion, and subsequently operate the coupling device to an uncoupled condition, wherein in the uncoupled condition the valve assembly is uncoupled from the outlet device.

Displacement of the drive member may be rotational or linear.

In operating the coupling device to the coupled condition, the method may comprise causing, by way of the drive member, displacement of the first cam member between first and second positions in the housing.

In operating the valve device to the charge condition, the method may comprise causing, by way of the drive member, displacement of the second cam member between first and second positions in the housing.

According to another aspect of the invention, there is provided a coupling mechanism with an actuating mechanism, preferably a linear mechanism, for controlling the movement of the first member and valve assembly to the coupling and uncoupling positions that is linked with track rollers or protrusions to a second member that controls the position of the valve between the charging and reticulation valve states with a cam tract that has a circumferential fixed pitch spiral grove;

a synchronized movement and axial compliance between valve assembly and the first member to delay setting the valve to the charging state when the socket and plug are not coupled and/or the latch secured. Conversely, the compliance and synchronization also ensures venting/re-circulation of the pressurized gas prior to uncoupling and detaching, thereby, enhancing the safety of the coupling operation.

Use of either a plug or socket as part of the valve assembly and appropriate socket or plug as part of the target's inlet interface to ensure effective coupling.

Manual or automated actuation that is achieved with the aid of a suitable electric actuator.

DETAILED DESCRIPTION OF THE DRAWINGS

In the following description, for purposes of explanation, numerous specific details are set forth in order to provide a thorough understanding of an example embodiment of the present disclosure. It will be evident, however, to one skilled in the art that the present disclosure may be practiced without these specific details.

Referring to FIGS. 1 to 3, and 6 to 14 of the drawings where a fluid coupling device in accordance with an example embodiment of the invention is generally indicated by reference numeral 10. The coupling device 10 is typically used to couple, and uncouple, a fluid source (not illustrated) to a target system (not illustrated). In one particular example embodiment, the fluid source is a static source of pressurised coolant gas to be supplied to a dynamic or moveable target system, for example, an infrared detector assembly.

In any event, referring to FIGS. 1 to 12, the fluid coupling device 10 comprises a housing 12 extending along a longitudinal axis X. In particular, the housing 12 is a cylindrical housing 12 defining an interior chamber therein, a charge aperture 12.1 (as can best be seen in FIGS. 1 and 8), a re-circulation/vent aperture 12.2 (as can best be seen in FIGS. 2 and 10), and an outlet aperture 12.3. The apertures 12.1 and 12.2 may be slots extending longitudinally along the housing 12.

The housing 12 typically houses the various components of the coupling device 10 in its interior chamber. In particular, the housing 12 houses a drive assembly, generally indicated by reference numeral 14, as well as a valve assembly, generally indicated by reference numeral 16. As can best be seen in FIGS. 7, 9, 11 and 13, the valve assembly 16 is typically comprised of a valve 16.1 and a coupling socket/plug 16.2 operatively connectable to the valve 16.1. The coupling socket 16.2 may be a female socket which is which may be engageable with a suitable outlet device in the form of an outlet coupling plug, particularly a male coupling plug 18 or vice versa. In this embodiment, one end of the male coupling plug 18 is typically mated for connection to one end of the female coupling socket 16.2. The socket 18 is operatively attached in fixed or attachable in a removable fashion to the target system. As will be described below, the coupling device 10 is in a coupled condition when the socket 16.2 is operatively connected or coupled to the plug 18 so as to permit flow communication therebetween. Conversely, the coupling device 10 is in an uncoupled condition when the socket 16.2 is uncoupled or disconnected from socket 18. The valve 16.1, the coupling socket 16.2, and the plug 18 may be commercial off the shelf components.

The valve 16.1 typically comprises a re-circulation/vent port 16.1.1 and a charge port 16.1.2, wherein the pressurised gas flow line is operatively attachable to the charge port 16.1.2. In the illustrated example embodiments, it will be noted that the ports 16.1.1 and 16.1.2 may comprise suitable connector devices, and the like which project through the respective apertures 12.2 and 12.1 for connection to suitable mated connectors as in the case of the charge port 16.1.2 or to the atmosphere as the in the case of the vent port 16.1.1 or re-circulation to a suitable vessel. The valve 16.1 further comprises an outlet port 16.1.3 which is operatively connected to the valve socket 16.2, particularly to an input of the valve socket 16.2. It will be understood that as is conventional, the valve 16.1 may comprise an actuator in the form of a valve stem 16.1.4 which is operable to operate the valve 16.1 in a conventional fashion. In particular, the valve stem 16.1.4 is operable to actuate the valve 16.1 between a re-circulation/vent condition wherein the re-circulation/vent port 16.1.1 is open, the outlet port 16.1.3 is open, and the charge port 16.1.2 is closed, and a charge condition wherein the re-circulation/vent port 16.1.1 is closed, the outlet port 16.1.3 is open, and the charge port 16.1.2 is open. The valve 16.1 may be a suitable quarter turn valve for reducing the range of rotation for accessing the charge and re-circulation/vent states. It will be noted that the pressure of coupling socket 16.2 and consequently the output pressure of the coupling device 10 is controlled by the valve stem 16.1.4. In the vent condition, the valve 16.1 is operated to permit the same to return to atmospheric pressure or re-circulation vessel pressure when the port 16.1.1 is employed for re-circulation. In the charge condition, the valve 16.1 is operated to allow pressurized gas to enter the charge port 16.1.2 and exit the outlet port 16.1.3 for flow transfer to the target system as will be described below. It will be appreciated that between the re-circulation/vent and charge conditions, the valve 16.1 is typically operated in a static condition in which all the ports 16.1.1-16.1.3 are closed.

The valve assembly 16 as described above is typically controllable by way of the drive assembly 14. To this end, the drive assembly 14 typically comprises a cylindrical drive member 20 having an interior, wherein the member 20 is axially rotatable about axis X (see FIGS. 7, 9, 11 and 13) in the direction of arrows Y and Z (as can illustrated be seen in FIG. 6). The cylindrical drive member 20 is operatively driveable by way of a gear arrangement 22 (as can best be seen in FIG. 3). In turn, the gear arrangement 22 is configured to be operated by way of a suitable motor 24 (as can best be seen in FIG. 7) under operation of a suitable control signal, for example, from a suitable programmable logic controller associated with an automation system.

The drive member 20 comprises a first cam engaging element or cam follower 20.1 projecting outwardly from the major wall of the member 20 (as can best be seen in FIG. 13), substantially transverse to the axis X; and a second cam engaging element or cam follower 20.2 (as can best be seen in FIG. 11) projecting internally into the interior of the drive member 20 from an internal wall thereof, also transverse to the axis X. The elements 20.1, 20.2, may be studs, screws, cam follower, track rollers or the like projecting transversely from the axis X.

Figure 1:
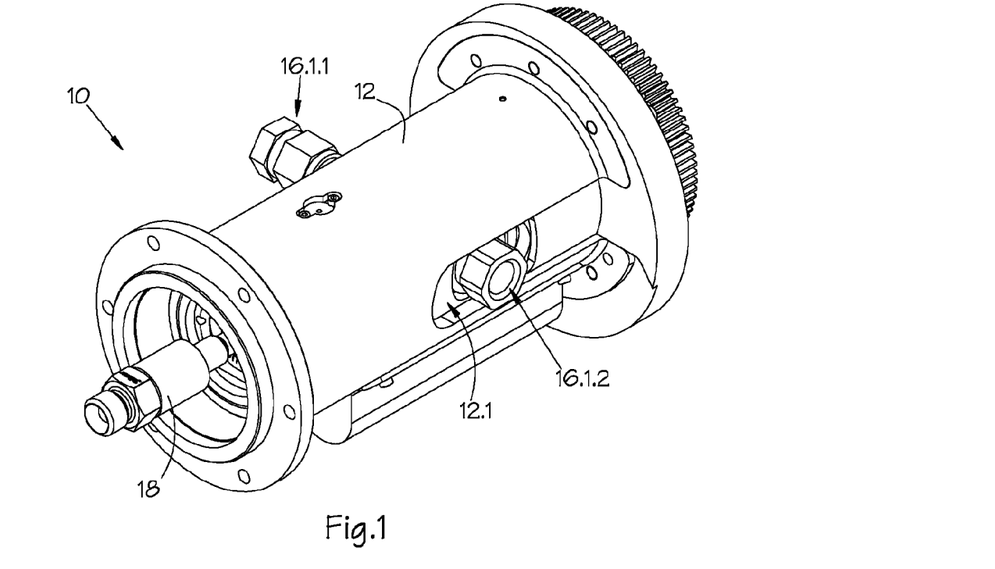
FIG. 1 shows a three-dimensional perspective view of a fluid coupling device in accordance with an example embodiment of the invention.
Figure 2:
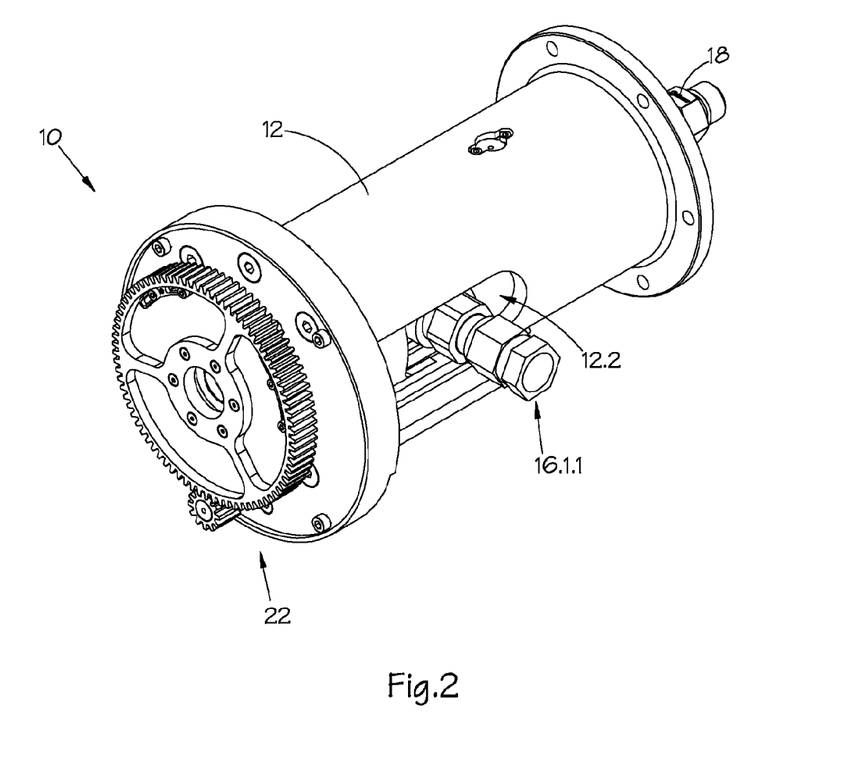
FIG. 2 shows another three-dimensional perspective view of a fluid coupling device in accordance with an example embodiment of the invention.
Figure 3:
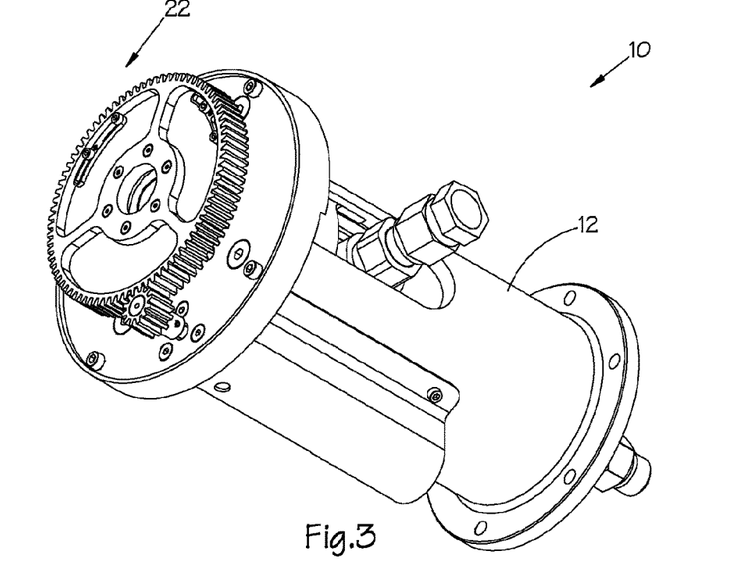
FIG. 3 shows yet another three-dimensional perspective view of a fluid coupling device in accordance with an example embodiment of the invention.
Figure 4:
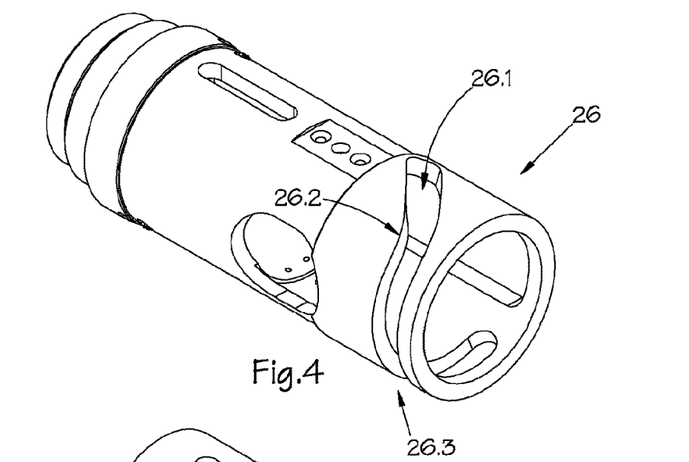
FIG. 4 shows a three-dimensional perspective view of a first cam member in accordance with an example embodiment of the invention.
Figure 5:
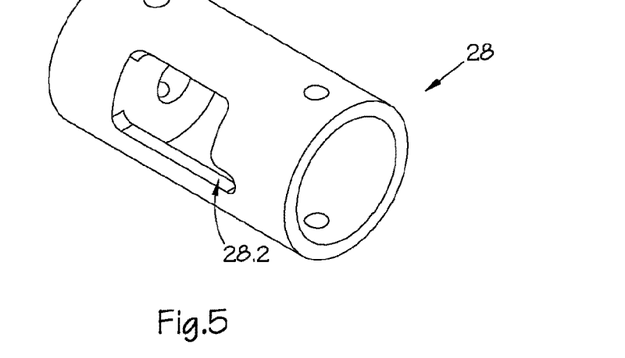
FIG. 5 shows a three-dimensional perspective view of a second cam member in accordance with an example embodiment of the invention.
Figure 6:
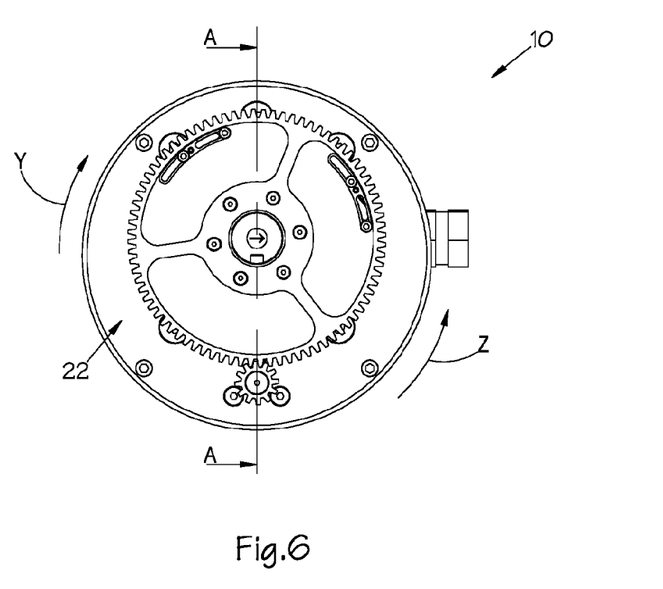
FIG. 6 shows an end view of a fluid coupling device in accordance with an example embodiment of the invention.
Figure 7:
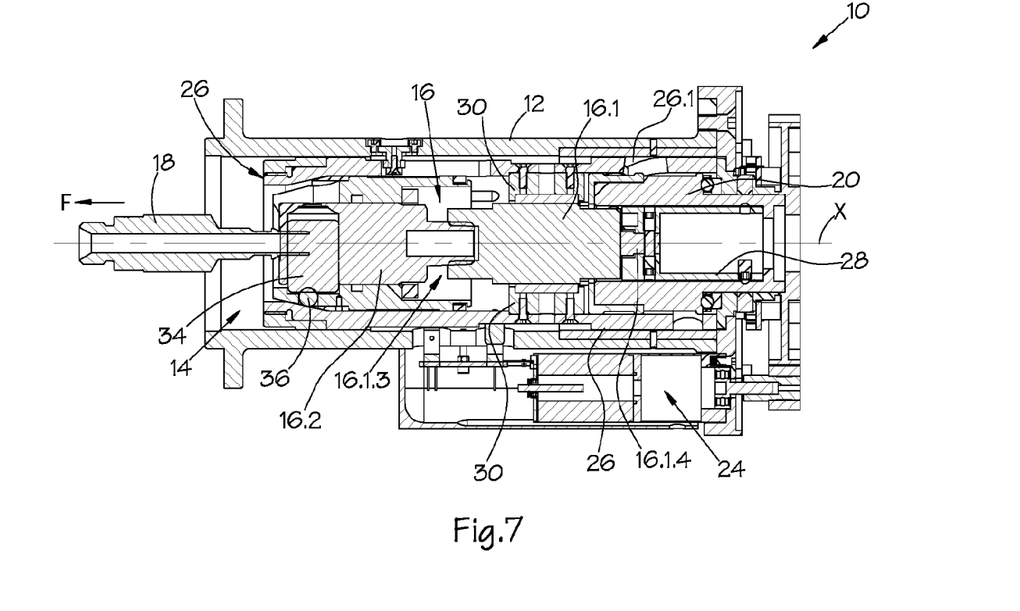
FIG. 7 shows a section view of the fluid coupling device in FIG. 6 at A-A.
Figure 8:
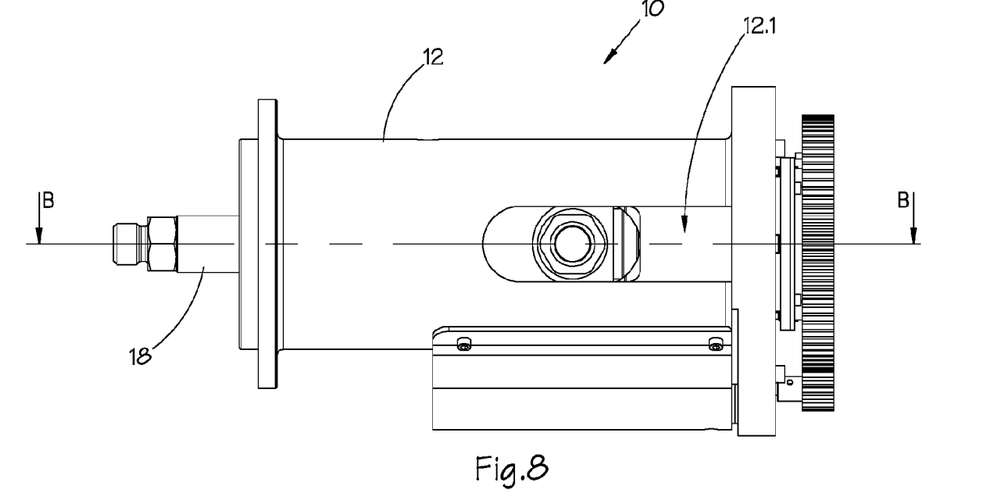
FIG. 8 shows a side view of the coupling device in accordance with the invention.
Figure 9:
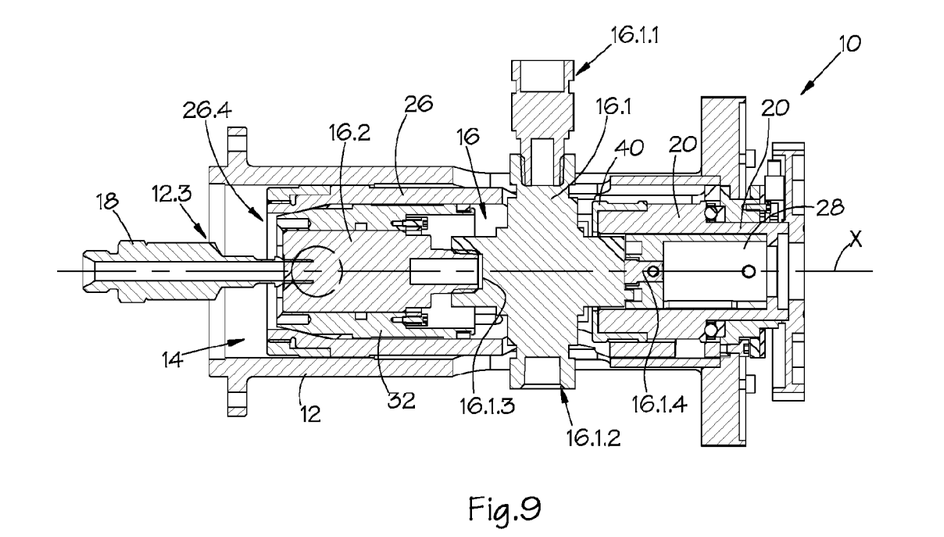
FIG. 9 shows a section view of the device in FIG. 8 at B-B.
Figure 10:
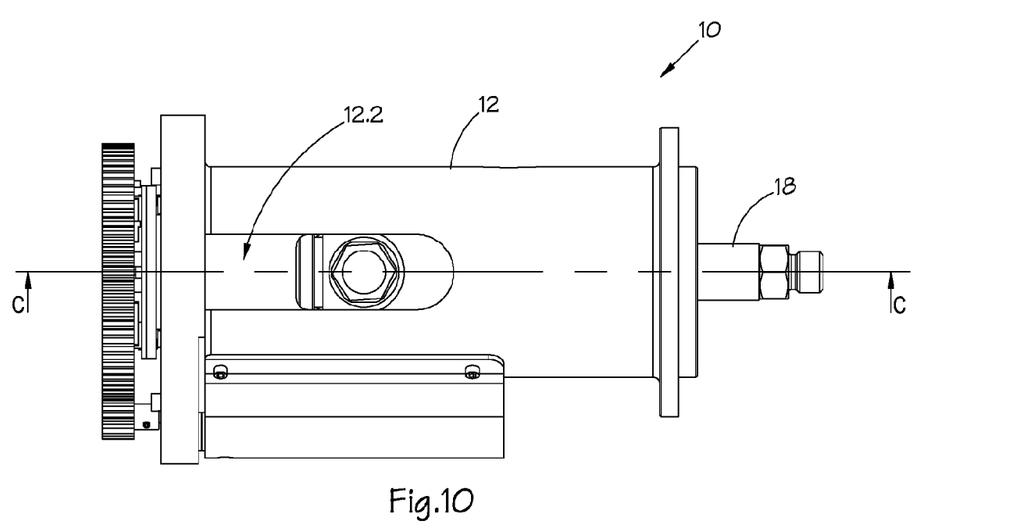
FIG. 10 shows another side view of the fluid coupling device in accordance with the invention.
Figure 11:
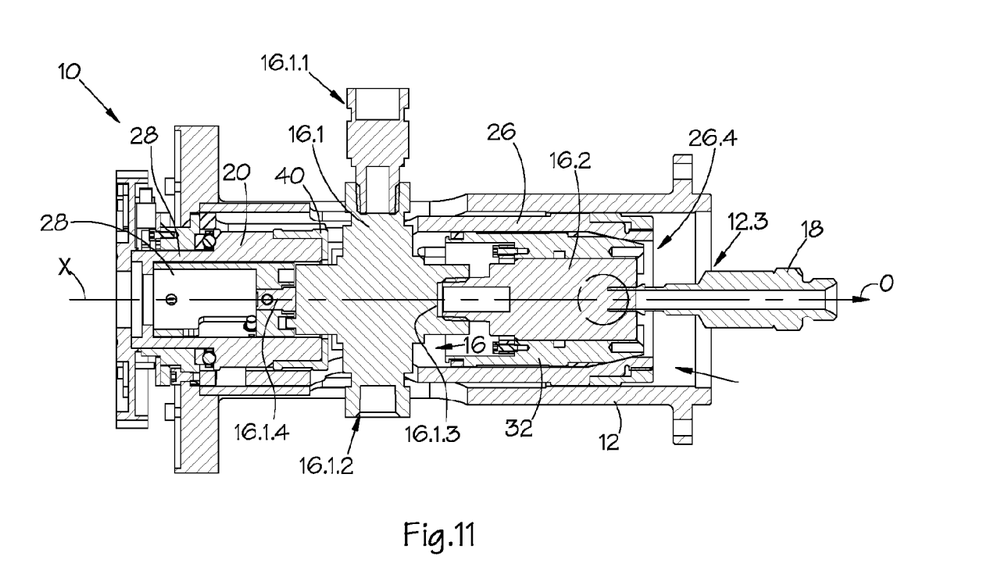
FIG. 11 shows a section view of the device in FIG. 10 at C-C.
Figure 12:
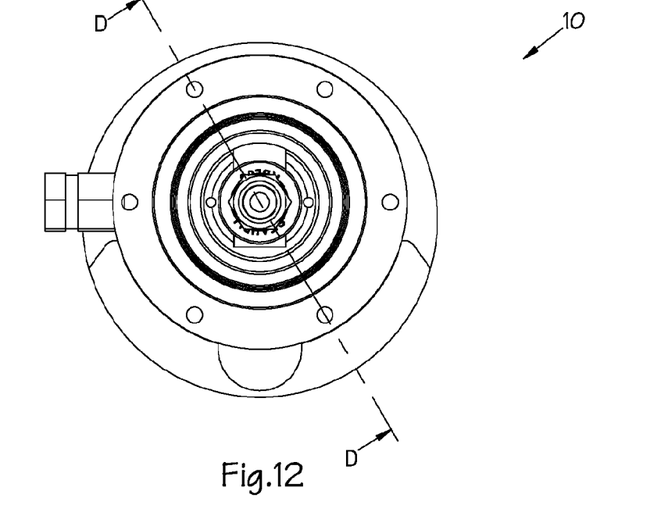
FIG. 12 shows another side view of the fluid coupling device in accordance with the invention.
Figure 13:
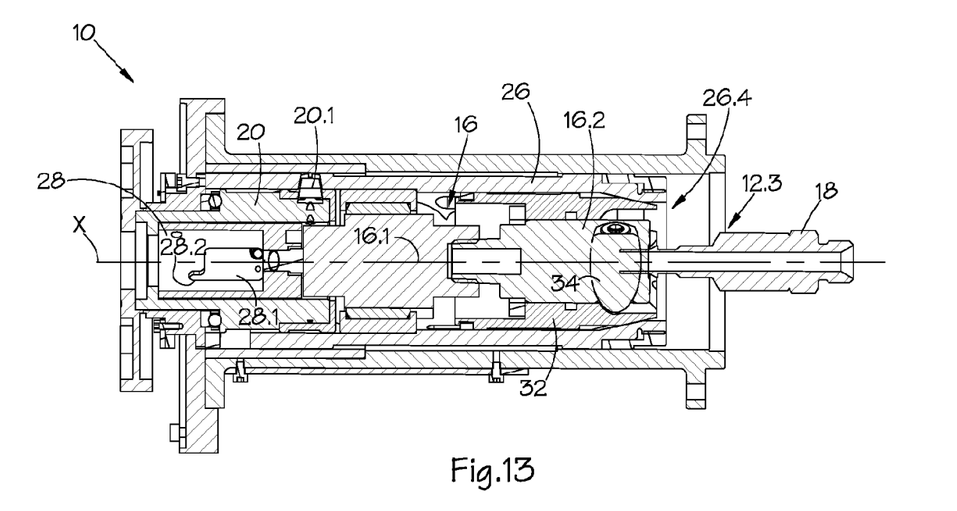
FIG. 13 shows a section view of the device in FIG. 12 at D-D.

The drive assembly 14 further comprises a first cam member 26 (as can best be seen in FIG. 4) and a second cam member 28 (as can best seen in FIG. 5). Both cams 26 and 28 are typically cylindrical cams and are arranged coaxially with the drive member 20, each other and the housing, as the case may be. In particular, the first cam member 26 defines an axial bore through which the drive member 20 is operatively receivable such that the first cam member encloses the drive member 20, as can be seen in FIGS. 7, 9, and 11. The second cam member 28 is typically locatable in the interior of the drive member 20, as can best be seen in FIGS. 7, 9, and 11. The first cam member 26 is slidably locatable in the housing and the second cam member is both slidably locatable in the housing as well as axially rotatable therein as will be discussed below.

The first cam engaging element 20.1 of the drive member 20 is operatively locatable within a cam track 26.1 of the cam member 26 (see FIG. 4), for example, a helical or spiral slot extending in a wall of the member 26. The track 26.1 is typically in communication with the bore of the member 26.

Member 26 may be directly or indirectly actuated by a linear actuator to eliminate cam track 26.1 for providing axial displacement in direction X. In the disclosed embodiment, cam 26 is a variable pitch cam in that the pitch of the cam track 26.1 is coarse initially at a first region 26.2 and finer at a second region 26.3. In this way, axial rotation of the drive member 20 in a first direction causes the element 20.1 disposed in the cam track 26.1 to displace the first cam member 26 in a substantially rectilinear fashion axially within the housing 12 in the direction of arrow F from a first position as seen in FIGS. 7, 9, 11 and 13 to an axially spaced second position. It will be appreciated that in a similar fashion, the cam member 26 may move in a direction opposite to arrow F, from a second to first position, upon actuation of the drive member 20 in an opposite second direction. In this regard, it will be noted that the rotation of the drive member 20 in the first and second directions causes reciprocating displacement of the first cam member 26 between first and second positions.

It will be understood that the first cam engaging member 20.1 travelling in the first portion 26.1 of the cam track 26 causes the first cam member to be displaced linearly at a first value and as the first cam engaging member travels in the subsequent second portion 26.2 of the cam track 26.2, the first cam member 26 is displaced linearly at a second value, wherein the first value is be greater than the second value and may be the linear speed at which the first cam member 26 travels or distance it travels in the housing 12. The first cam member 26 is suitable to operate the device 10 between the coupled and uncoupled conditions as will be described below.

The device 10 typically comprises suitable pads 30, for example, annular pads, collars, or the like to restrict or prevent twisting or axial rotation of the valve assembly 16, particularly the valve 16.1, during operation of the device 10. In one example embodiment, the pads 30 provide an engagement and a bearing surface to engage with the first cam member 26 and be displaced therewith in a linear fashion upon displacement of the cam member 26, and to allow the member 26 to be slidably displaceable relative to the arrangement 16 as will be described below.

The second cam member 28 is typically attached at one end to the valve stem 16.1.4, for example, via a dowel. In this way, axial rotation of the cam member 28 between first and second positions in a first rotational direction and a second opposite rotational direction operates the valve 16.1 at least between re-circulation/vent and charge conditions.

The second cam member 28 defines a slot 28.1 in a wall thereof, wherein the slot is in communication with an interior of the member 28 and extends to a smaller notch 28.2. The slot 28.1 may introduce a dwell period for the initial part of the actuating movement and the notch 28.2 is used to operate the valve with minimal hysteresis as will be described below. Location of the second cam engaging element 20.2 in the notch and rotation of the member 20 causes corresponding rotation of the member 20 in the same direction of rotation of the member 20, i.e., in direction Z and opposite direction Y, so as to actuate the valve 16.1 as alluded to above and as will be described below.

Alternatively, a spiral track, preferably a circumferentially machined grove with a fixed pitch spiral depth may be employed to cause the second cam member 28 to rotate, thereby, altering valve states in the presence of a relative linear displacement between member 26 and member 28.

The device 10 further comprises an annular socket holder or coupling latching mechanism 32 within which the valve socket/plug 16.2 may be locatable such that the holder 32 is disposed circumferentially around the valve socket 16.2. It will be understood that the socket holder 32, also provides and engaging and a bearing surface for the valve assembly 16 and the first cam member 26 in a similar way to the pads 30 as described above.

It will be noted that the first cam member 26 is displaceable in the direction of arrow F from a first position as can best be seen in FIGS. 7, 9, and 11 to a second position wherein an end portion 26.4 of the first cam member 26 adjacent an end of the housing 12. It will be noted that due to the corporation of at least the holder 32 and the pads 30 with the inner walls of the first cam member 26, the valve assembly 16, and the second cam member 28 operatively attached thereto, travel line a linear fashion substantially as a single unit as the cam member 26 displaces from the first to the second position.

However, as the cam member 26 is displaced from the first position to the second position, it will be noted that the member 28 is displaced linearly within the housing 12 until the element 20.2 is brought into engagement with the notch 28.2, which effectively halts the linear travel of the second cam member 28 and thus the valve assembly 16 whilst the first cam member 26 continues its linear travel to the second positon. In this way, the rotation of the drive member 20 causes rotation of the member 28 thereby actuating the valve stem 16.1.4 which in turn actuates the valve 16.1, accordingly.

It will be appreciated that as the engagement element 20.1 travels in the cam track 26.1, the member 26 is displaced linearly until the element 20.1 is at predetermined position in the cam track 26.1, for example, adjacent the boundary between first portion 26.2 and second portion 26.3 of the cam track 26.1, whereby the second cam engaging element 20.2 is brought into engagement with or location within the notch 28.2. The first cam member 26 continues travelling linearly to the second position albeit slower due to the element 20.1 travelling in the second portion of the cam track 26.1.

In one example embodiment, a switch 34 (see FIG. 7) may be provided to facilitate coupling of the valve socket/plug 16.2 to the mating target socket/plug 18. To this end, it will be noted that the end portion 26.4 of the first cam member 26 may define substantially tapered internal walls as can be seen in FIGS. 7, 9 and 11, at least adjacent an end of the end portion 26.4. The device 10 comprises a displaceable spherical member or ball 36 (see FIG. 7) located in a cradle defined by at least the valve socket/plug holder or latching point 32 and the inner wall or surface of the cam member 26.

With the device 10 in the uncoupled condition, the ball 36 typically actuates or depresses the switch 34 to prevent coupling of the socket/plug 18 to the valve assembly 16 as the ball 36 is bordered by the tapered internal surface of the member 26 which urges the ball 36 to actuate the switch 34. A spring may be provided with the ball so as to resiliently bias the same in the cradle.

It will be noted that as the valve assembly 16 is stopped from linear displacement, due to the location of the element 20.2 in the notch 28.2 which is synchronized with the mating of socket 16 and plug 18, the further travel of the first cam member 26 in the direction of arrow F to the second position causes the member 26 be displaced relative to the valve assembly 16 and thus the holder 32 till the tapered internal surface no longer borders the ball 36 and thus no longer urges the ball 36 to operate the switch 34. The increased size of the cradle defined by the holder 32 and the internal surface of the cam member 26 which is parallel to the axis X causes the ball 36 to no longer actuate the switch 34 thereby causing the same to establish a coupling between the valve assembly 16 and the socket 18. In other words to operate the device 10 in the coupled condition wherein the valve assembly is effectively coupled to the outlet 12.3 of the housing 12.

Figure 14:
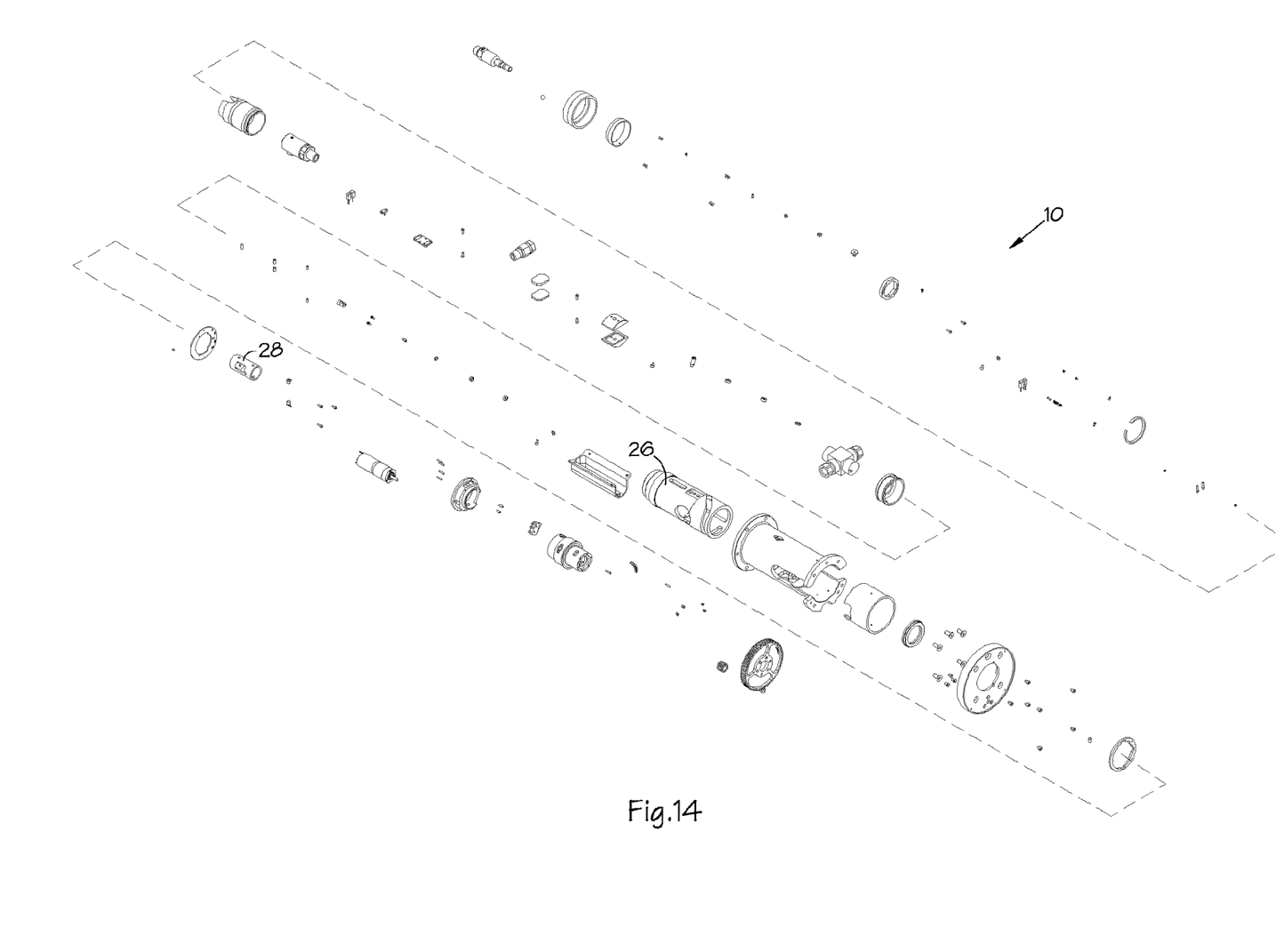
FIG. 14 shows a perspective exploded view of the fluid coupling device in accordance with an example embodiment of the invention.

Though the device 10 comprises various seals, bearings, mounting plates, attachment means in the form of screws, bolts, nuts and the like as illustrated in FIG. 14, it will be appreciated that these will be evident to those skilled in the field of invention and thus are not described further herein.

In use, referring to FIGS. 1 to 14 of the drawings, a target system to be supplied with pressurized gas is typically located adjacent the valve socket 18 or is connectable to the socket 18. A pressurized gas line is operatively connected to the charge port 16.1.2 of the valve 16.1 and optionally the re-circulation/vent port 16.1.1 is provided with a suitable re-circulation/vent line.

When it is desired to supply pressurized gas to a target, manual input (not shown) or a motor 24 is actuated, for example, under suitable instructions from a control system (not shown) to actuate the gear arrangement 22 to operate the drive member 20 is a first direction Z. It will be appreciated that the device 10 is typically in an uncoupled condition with the first cam member 26 in the first positon as illustrated in FIGS. 7, 9, and 11.

Rotation of the drive member 20 in the direction of arrow Z causes the first cam engaging element 20.1 located in the cam track 26.1 to urge the first cam member 26 to be displaced linearly in a relatively fast fashion as the element 20.1 travels in the first portion 26.2 of the track from the first position towards the second position in the direction of arrow F. As mentioned above, displacement of the cam member 26 also causes displacement of the valve assembly 16 also the second cam member 26 in a linear fashion in the housing 12.

As the second cam member 28 is displaced linearly, the rotation of the drive member 20 causes the second cam engaging element 20.2 to travel in the slot 28.1, particularly substantially diagonally across the same to come into engagement with or location in the notch 28.2 which effectively halts the linear travel of the cam member 28 and the valve assembly 16. As mentioned above, as the element 20.2 is coming into engagement with the notch 28.2, the device 10, particularly the assembly 14 is synchronized such that the first cam engaging element 20.1 is entering the second portion 26.3 of the cam track 26.1 so that the linear displacement of the cam member 26 slows down as compared to the linear displacement as the member 20.1 was in the first portion 26.2 of the track 26.1. Moreover, as the valve assembly 16 ceases its linear travel in the housing 12, it will be noted that the socket/plug 16.2 is at a predetermined position to be coupled to the plug/socket 18.

As the holder 32 and the pad 30 provide bearing surfaces, the internal surface of the member 26 slides past the same as the member 26 approaches the second position, whilst under action of the drive member 20, the rotation of the member 20 causes rotation of the second cam member 28 which in turn actuates the valve stem 16.1.1 to operate the valve 16.1 from the re-circulation/vent condition to the charge condition. It will be noted that in the interim between operation of the valve 16.1 from the re-circulation/vent condition to the charge condition and vice versa, the valve 16.1 is in the static position with all ports 16.1.1-16.1.3 closed.

Moreover, it will be noted that the member 28 does not complete its rotation to cause the valve 16.1 to be operated to the charge condition until the first cam member 26 is at the second position. In this regard, it will be noted that in completing its travel from the first positon to the second position as the element 20.1 is in the second portion 26.3 of the cam track 26.1, the cam member 26 slides past the valve assembly 16 to couple the valve assembly 16 to plug/socket 18 once in the second position. In particular, the member 26 slides in the direction of arrow F relative to the substantially stationary holder 32 and as the member 26 is in the second positon, the tapered inner surface of the end portion 26.4 abutting the ball 36 moves past the same in the direction of arrow F. The ball 36 thus releases the switch 34 due to the increased dimensions of its cradle and therein actuates the device 10 to the coupled condition wherein the socket/plug 16.2 is in fluid flow communication with the plug/socket 18.

Simultaneously upon coupling of the device 10, in a substantially synchronized fashion, the second cam member 28 rotates under action of the drive member 20 to actuate the valve to the charge condition such that pressurized gas from the gas source is inlet to the valve 16.1 and channeled via the socket 16.2, in flow communication with the outlet port 16.1.3 of the valve 16.1, to the male socket 18 for egress to the target or receiving vessel (not shown). In some example embodiments, it will be appreciated that the member 28 may be controlled to operate the inlet port and/or outlet port partially or a predetermined degree as opposed to opening the same completely so as to control the pressure exiting the coupling 10 as will be understood by those skilled in the field of invention. In this way, the charge condition may be a variable charge condition between a partially open inlet port and/or outlet port and a fully open inlet port and/or outlet port.

Should the motor 24 receive a suitable control signal to operate the device 10 to operate the same to an uncoupled condition, the motor 24 controls the gear arrangement 22 in a reverse direction which causes the same to rotate the drive member 20 in an opposite second direction of arrow Y.

As the drive member 20 rotates, it causes the second cam member 28 to rotate in a second direction of rotation matched to that of the member 20 thus operating the valve 16.1 out of the charge condition and towards the re-circulation/vent condition to the re-circulation/vent valve state 16.1, wherein the valve 16.1 is in a static condition therebetween. Simultaneously, the element 20.1 travels in in the second portion 26.3 towards the first portion 26.2 of the track 26.1 causing the tapered inner surface of the end portion 26.4 of the member 26 to slide relative to the valve assembly 16 such that the tapered inner surface again abuts the ball 36 and urges the same to depress/actuate the switch 34 thus uncoupling the coupling union from flow communication with the male valve socket/plug 18 thus operating the device 10 to an uncoupled condition.

Once the element 20.1 is adjacent the border of the first and second portions 26.2 and 26.3 of the track 26.1, the valve 16.1 is in the vented condition to bring the coupling device 10 to atmospheric pressure or re-circulation vessel pressure when a re-circulation pipe is attached. The displacement of the element 20.1 in the track 26.1 causes the displacement of the member 26 in a direction opposite to the direction of arrow F and causes the similar linear displacement of the valve assembly 16 and the member 28 and thus the displacement of the element 20.2 is out of the notch 28.2. In this way the first cam member 26 is brought back to the first position.

In other example embodiment of the invention, the spiral portion 26.1 may be replaced with a threaded mandrel so as to increase the effective load bearing area for converting the rotary movement from a motor into linear coupling and decoupling motion. The female coupling and valve as a sub-assembly unit are compliantly linked to the threaded mandrel via a resiliently compliant joint. The stiffness of the compliant joint allows the coupling subassembly and threaded mandrel to move linearly with the valve in the venting position until the female coupling engages the male plug, thereby completing the coupling action. A threaded or smooth mandrel can also be used to operate the coupling by hand.

The coupling subassembly remains stationary once the coupling action is completed due to mechanical interference. The mandrel continues to move linearly by compressing the compliant member while the second cam/valve cam follower rotates the valve stem from the vent position to the charging position. A fixed spiral cam profile of the valve cam follower constrains valve position as a function of the compliant member's compression displacement. This construction removes hysteresis and creates an auto vent function. Uncoupling is achieving by retracting the mandrel until the female coupling is released and retracted to the uncoupled position.

Though not shown it will be appreciated that in some example embodiments, the first cam member may be omitted and the second cam member may be attachable to the valve assembly as described above. In this example embodiment, the drive member may be drivingly attachable to the second cam member to bring about linear displacement of the same to displace the valve assembly to operate the device to the coupled condition. A mechanical interference member may be provided in the housing to limit further linear motion of the second cam member when the device is in the coupled condition. In this regard, the second cam member may comprise a cam with a fixed pitch spiral profile so that further displacement of the drive member linearly in the first direction causes the second cam member to rotate (e.g. by way of a cam engaging protrusion provided on the drive member or on an interior of the housing) to operate the valve in a similar manner as descried above. Similarly when linearly displacing the drive member in the second direction opposite to the first direction, the second cam member operates the valve and then allows the device to be operated to the uncoupled condition.

In view of the last mentioned example embodiment, it will be noted that the second cam member may comprise a linear cam portion with a linear profile or a cam groove/slot parallel with the longitudinal axis of the housing, said linear cam portion being in communication with the spiral portion.

The present invention provides a convenient device for coupling and charging, as well as uncoupling and recirculating/venting a valve supply highly pressurized fluids with a single synchronous action which is inherently safe. In this way, there is no need to separate synchronization, etc. of the charge and coupling steps with the uncoupling and re-circulation/vent steps.

The invention claimed is:

1. A coupling device for coupling a fluid source to an output, wherein the coupling device comprises:
   a housing defining a chamber, the housing comprising inlet, outlet, and re-circulation/vent apertures in communication with the chamber;
   a valve assembly disposed in the chamber, the valve assembly comprising a valve having an inlet port accessible via the inlet aperture of the housing and connectable to the fluid source, an outlet port to output the fluid received from the inlet port, and a re-circulation/vent port accessible via the re-circulation/vent aperture to vent the valve to atmosphere or re-circulate the fluid to an appropriate vessel, wherein the valve is operable between static, re-circulation/vent, and charge conditions, wherein in the static condition all the ports are closed, in re-circulation/vent condition the re-circulation/vent port and outlet port is open and the inlet port is closed, and in the charge condition the re-circulation/vent port is closed and both the inlet and outlet ports are open so as to permit fluid flow from the inlet port to the outlet port;
   a drive assembly located in the housing and operatively engageable with the valve assembly, wherein the drive assembly comprises:
      a cylindrical drive member disposed in the chamber, wherein the cylindrical drive member is displaceable relative to the chamber in first and second directions of motion, the second direction being opposite of the first direction, wherein the cylindrical drive member comprises first and second cam engaging elements in the form of transversely protruding members, wherein the first cam engaging element projects outwardly from the cylindrical drive member substantially transverse to a longitudinal axis of the cylindrical drive member, and wherein the second cam engaging element projects inwardly from the cylindrical drive member substantially transverse to the longitudinal axis of the cylindrical drive member;
      a first cam member operatively engageable with the cylindrical drive member and the valve assembly, wherein the first cam member is in the form of a cylindrical cam which defines a cam track for receipt of the first cam engaging element therein such that rotation of the cylindrical drive member causes substantially rectilinear displacement of the first cam member axially in the housing between first and second positions; and a second cam member operatively engageable with the cylindrical drive member and the valve assembly, wherein the second cam member is a cylindrical cam which defines a notch for receipt of the second cam engaging element therein, wherein the first cam member and the second cam member are configured to be displaced in the housing by the displacement of the cylindrical drive member in the first and second directions of motion so as to cause the operation of the coupling device between coupled and uncoupled conditions, and the valve between the re-circulation/vent and charge conditions in a synchronized fashion.

2. The coupling device as claimed in claim 1, wherein displacement of the cylindrical drive member in the first direction causes the first cam member to operate the coupling device to the coupled condition, wherein in the coupled condition the valve assembly is connected or coupled to an outlet socket/plug operatively connectable to the outlet aperture of the housing, and subsequently further rotation of the cylindrical drive member in the first direction causes the second cam member to operate the valve to the charge condition.

3. A The coupling device as claimed in claim 1, wherein rotation of the cylindrical drive member in the second direction causes the second cam member to operate the valve to the re-circulation/vent condition, and subsequent rotation of the cylindrical drive member in the second direction causes the first cam member to operate the coupling device to an uncoupled condition.

4. The coupling device as claimed in claim 1, wherein rotation of the cylindrical drive member in the first direction displaces the first cam member from the first position in which the coupling device is in the uncoupled condition to the second position in which the coupling device is in the coupled condition; and with the first cam member in the second position, further rotation of the cylindrical drive member in the first direction displaces the second cam member to operate the valve to the charge condition.

5. The coupling device as claimed in claim 1, wherein rotation of the cylindrical drive member in the second direction displaces the second cam member to operate the valve from the charge condition to the re-circulation/vent condition; and with the valve operated in the re-circulation/vent condition, further rotation of the cylindrical drive member in the second direction causes operation of the coupling device to the uncoupled condition.

6. The coupling device as claimed in claim 1, wherein the second cam member is attached removably or fixedly to a valve actuator of the valve so as to operate the same, wherein rotation of the cylindrical drive member, when the second cam engaging element is located in the notch, causes rotation of the second cam member between first and second positions causing operation of the valve between re-circulation/vent and charge conditions, and vice versa.

7. The coupling device as claimed in claim 1, wherein the second cam member defines a circumferential slot or opening, wherein the circumferential slot or opening introduces a dwell period for an initial part of an actuating movement and the notch is used to operate the valve with minimal hysteresis.

8. The coupling device as claimed in claim 1, wherein displacement of the first cam member linearly in the housing under action of the cylindrical drive member causes displacement of the valve assembly operatively engageable therewith, and thus displacement of the second cam member attached to the valve assembly, linearly in the housing until a predetermined position where the second cam engaging element of the cylindrical drive member is brought into the notch of the second cam member or creates relative linear displacement such that further rotation of the cylindrical drive member or linear displacement of the first cam member causes the second cam member to rotate between first and second positions so as to actuate the valve between re-circulation/vent and charge conditions.

9. The coupling device as claimed claim 1, wherein the drive assembly is synchronized such that the second cam engaging member is brought into the notch of the second cam member as the first cam engaging element is about to enter into the second portion of the cam track of the first cam member, the second portion of the cam track having finer pitch than the first portion of the cam track such that the first cam member is linearly displaced at the second value to the second position to operate the coupling to a coupled position as the second cam member begins to rotate, at substantially a speed of rotation of the cylindrical drive member, to actuate the valve to the charge condition, wherein the first cam member is in the second position prior to the valve being actuated to the charge condition by the second cam member.

10. The coupling device as claimed in claim 1, wherein the first cam member, the cylindrical drive member, and the second cam member are co-axially arranged.

11. The coupling device as claimed in claim 1, wherein the cam track of the first cam member has a variable pitch spiral profile that is coarse at a first portion thereof and gradually becomes finer towards a second portion thereof such that a linear travel in the housing is reduced as the first cam engaging element moves from the first portion into the second portion of the cam track with finer pitch.

12. The coupling device as claimed in claim 11, wherein as the first cam engaging member travels in the first portion of the cam track, the first cam member may be displaced linearly at a first value, and as the first cam engaging member travels in the subsequent second portion of the cam track, the first cam member may be displaced linearly at a second value, wherein the first value is greater than the second value.

13. The coupling device as claimed in claim 1, wherein the drive assembly comprises a gear arrangement operatively connected to the cylindrical drive member wherein operation of the gear arrangement causes displacement of the cylindrical drive member in the first and second directions of motion.

14. The coupling device as claimed in claim 13, wherein the gear arrangement and thus the cylindrical drive member is controllable via an electrically actuated motor in response to suitable control signals received thereby.

15. The coupling device as claimed in claim 1, wherein one end of the first cam member defines internal walls which taper toward the one end of the first cam member; and wherein the coupling device comprises a displaceable spherical ball located in a cradle defined by the valve plug/socket holder or latching point and an inner surface of the first cam member so as to engage a switch, wherein the switch is configured to facilitate coupling of a valve socket to an outlet socket.

16. The coupling device as claimed in claim 15, wherein with the first cam member in the first position, the displaceable spherical ball is located between a tapered inner wall of the first cam member and the switch so as to actuate the switch to control latching and release operations of the coupling device.

17. The coupling device as claimed in claim 15, wherein with the first cam member in the second position, the displaceable spherical ball is located between a non-tapered inner wall of the first cam member and the valve plug/socket holder so as to release the switch to operate the coupling device to the coupled condition.

18. A method of supplying fluid from a fluid source to a target system, the method comprising:
   providing a coupling device as claimed in claim 1;
   controlling displacement of the cylindrical drive member in the first direction to operate the coupling device to the coupled condition in a synchronous fashion, wherein in the coupled condition the valve assembly is coupled to an outlet socket operatively connectable to the outlet aperture of the housing, and subsequently operate the valve to the charge condition; and
   controlling displacement of the cylindrical drive member in the second direction so as to operate the valve to the re-circulation/vent condition in a synchronous fashion, and subsequently operate the coupling device to the uncoupled condition, wherein in the uncoupled condition the valve assembly is uncoupled from the outlet socket.

19. The method as claimed in claim 18, wherein in operating the coupling device to the coupled condition, the method comprises causing, by way of the cylindrical drive member, displacement of the first cam member between first and second positions in the housing.

20. The method as claimed in claim 18, wherein in operating the valve device to the charge condition, the method comprises causing, by way of the cylindrical drive member, displacement of the second cam member between first and second positions in the housing.

* * * * *

UNITED STATES PATENT AND TRADEMARK OFFICE
CERTIFICATE OF CORRECTION

PATENT NO. : 11,221,096 B2
APPLICATION NO. : 16/338967
DATED : January 11, 2022
INVENTOR(S) : Ipeleng Samson Mathebula et al.

It is certified that error appears in the above-identified patent and that said Letters Patent is hereby corrected as shown below:

In the Specification

In Column 5, Line 25, delete "positon," and insert --position,--.

In Column 10, Line 64, delete "positon." and insert --position.--.

In Column 11, Line 64, delete "positon" and insert --position--.

In Column 12, Line 41, delete "positon" and insert --position--.

In Column 12, Line 48, delete "positon," and insert --position,--.

In the Claims

In Column 15, Claim 3, Line 33 (Approx.), delete "A The" and insert --The--.

In Column 16, Claim 9, Line 19, delete "claimed claim" and insert --claimed in claim--.

Signed and Sealed this
Twenty-fourth Day of May, 2022

Katherine Kelly Vidal
Katherine Kelly Vidal
*Director of the United States Patent and Trademark Office*